United States Patent [19]

Avgoustis

[11] Patent Number: 5,618,236
[45] Date of Patent: Apr. 8, 1997

[54] ANTI-CROSS THREAD FASTENER WITH CLEANING TIP

[75] Inventor: Gus G. Avgoustis, Westland, Mich.

[73] Assignee: Ring Screw Works, Madison Heights, Mich.

[21] Appl. No.: 420,426

[22] Filed: Apr. 12, 1995

Related U.S. Application Data

[62] Division of Ser. No. 109,610, Aug. 19, 1993, Pat. No. 5,419,667.

[51] Int. Cl.⁶ .................................................. B21K 1/56
[52] U.S. Cl. ........................................................ 470/12
[58] Field of Search ........................... 470/8, 9, 10, 11, 470/12, 16, 65; 411/411, 417, 418, 424

[56]     References Cited

U.S. PATENT DOCUMENTS

| 2,165,011 | 7/1939 | Rosenberg | 411/420 |
| 2,278,411 | 4/1942 | Braendel | 411/418 |
| 3,451,080 | 6/1969 | McIntyre et al. | 411/418 |
| 3,942,406 | 3/1976 | Egner | 411/418 |
| 3,978,760 | 9/1976 | Muenchinger | 411/386 |
| 4,655,661 | 4/1987 | Brandt | 411/387 |
| 4,673,323 | 6/1987 | Russo | 411/387 |
| 4,789,288 | 12/1988 | Peterson | 411/426 |
| 4,915,560 | 4/1990 | Peterson et al. | 411/386 |
| 4,952,110 | 8/1990 | Avgoustis et al. | 411/426 |
| 4,963,064 | 10/1990 | Peterson | 411/387 |
| 4,981,406 | 1/1991 | Weiss et al. | 411/417 |
| 5,064,327 | 11/1991 | Hughes | 411/417 |
| 5,244,327 | 9/1993 | Whitesell | 411/412 |

FOREIGN PATENT DOCUMENTS

| 609809 | 12/1960 | Canada | 411/418 |
| 491710 | 9/1938 | United Kingdom | 411/418 |

Primary Examiner—Lowell A. Larson
Assistant Examiner—Thomas C. Schoeffler
Attorney, Agent, or Firm—Harness, Dickey & Pierce, P.L.C.

[57]     ABSTRACT

A threaded fastener has an eccentric tip with a smooth portion, a threaded portion and a cleaning recess formed into the threaded portion of the tip. The recess and tip are formed in the heading operation prior to rolling the threads onto the shank which provides better thread quality.

4 Claims, 2 Drawing Sheets

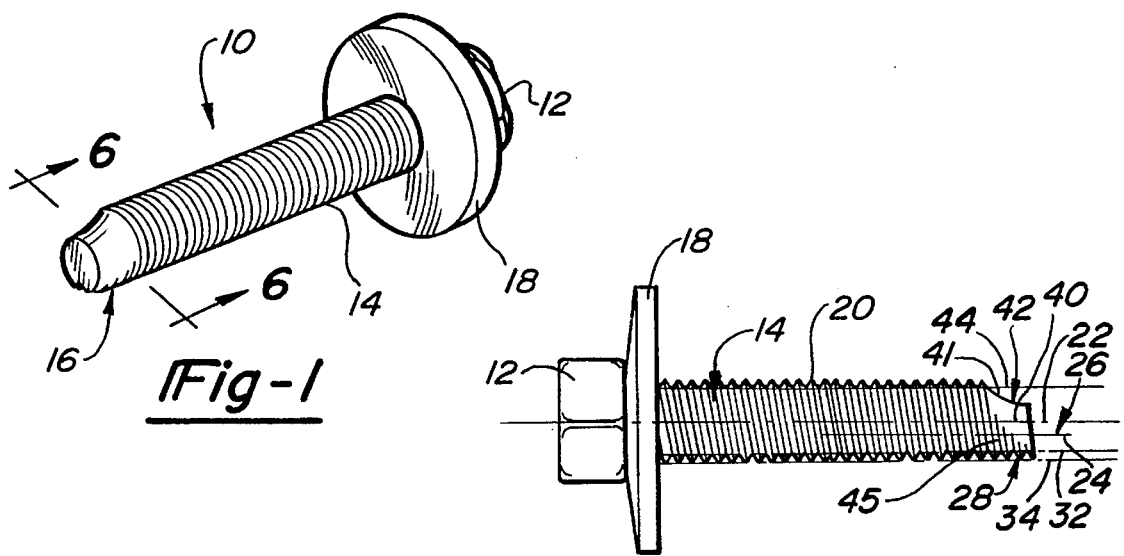
Fig-1
Fig-2
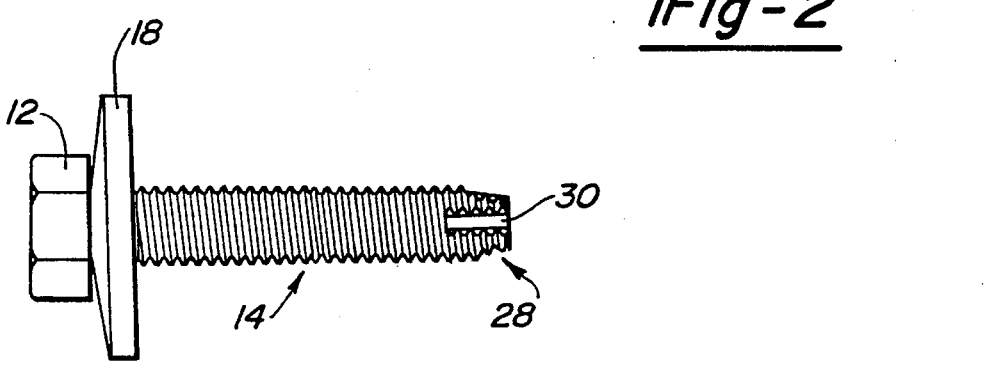
Fig-3
Fig-4
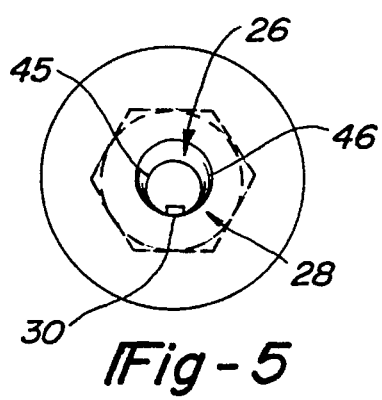
Fig-5
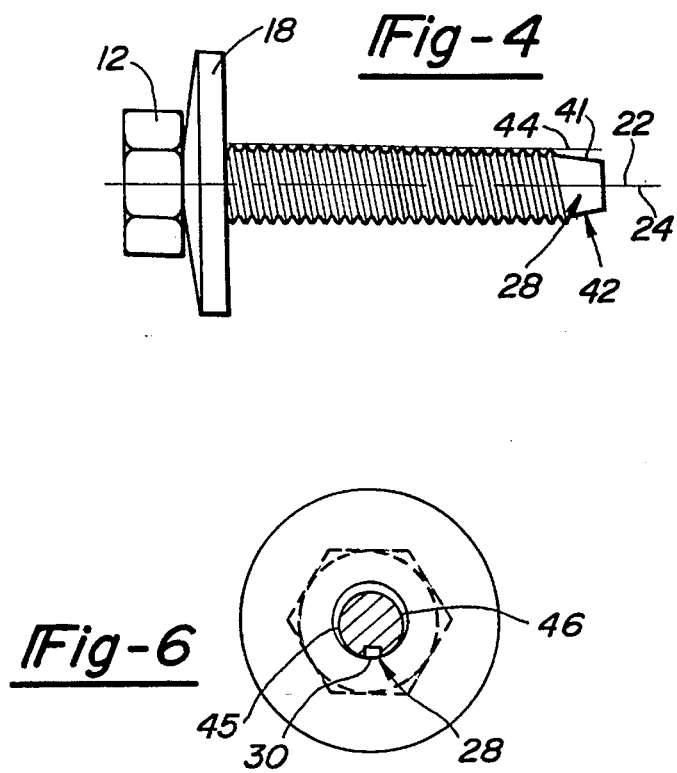
Fig-6

ANTI-CROSS THREAD FASTENER WITH CLEANING TIP

This is a division of U.S. patent application Ser. No. 08/109,610, filed Aug. 19, 1993, now U.S. Pat. No. 5,419,667.

BACKGROUND AND SUMMARY OF THE INVENTION

The present invention relates to threaded fasteners and, more particularly, to anti-cross thread screws or fasteners with cleaning points.

When a screw or bolt is screwed into a threaded nut or port, where the port is subjected to foreign materials such as dust, dirt, weld splatter, paint or the like, the foreign material is carried into the mating area between the external and internal threads as the screw or fastener is threaded into the port. If foreign material is carried into the threads, galling and/or seizing usually results during assembly. This galling and seizing of the bolts causes substantial down time during an assembly operation, since the seize fastener must be removed, the hole cleaned out and a replacement fastener installed.

A common problem exists in the fastener field with cross threading. Cross threading generally occurs when the threaded fastener is received into a threaded nut or hole wherein the threads are in misalignment. Typical misalignments are axial and angular misalignments. In an axial misalignment, the axis of the shank of the screw is parallel with, but not colinear with, the axis of the receiving nut or hole. In an angular misalignment, the axis of the shank of the bolt is at an angle with respect to the axis of the nut or threaded hole. These misalignments cause the fasteners to be cross threaded and generally lead to seizing of the fasteners. The seizing causes a detrimental effect to both the bolt and nut, generally ruining one, the other or both, and causing little or no clamp load in the joint.

U.S. Pat. No. 4,952,110 illustrates an anti-cross threading screw. This fastener satisfactorily provides for anti-cross threading, but fails to provide a cleaning function. The present invention is an improvement over this patent. Accordingly, U.S. Pat. No. 4,952,110, the specification and drawings, is expressly herein incorporated by reference.

A traditional method of forming recesses or flutes onto a bolt is during the thread rolling operation. It requires a notch to be cut into the thread die, a fluter insert is positioned into the notch and as the part goes through the thread die, when it hits the fluter insert, it takes the form of the flute. A disadvantage in this type of method is that when the bolt goes through the thread die and hits the flute, it has a turbulent effect and the bolt wants to slip. A so-called drunken thread or a poor quality thread can result from this condition.

The method of the present invention provides forming the recess during the heading operation while forming the tip. By forming the recess or flute during the heading operation while forming the tip, when the part is placed into the thread die, there is no turbulence while the threads are applied on the bolt, thus forming good quality threads without the use of fluter inserts.

From the following detailed description of the present invention taken in conjunction with the accompanying drawings and claims, other objects and advantages of the present invention will become apparent to those skilled in the art.

BRIEF DESCRIPTION OF THE DRAWINGS

FIG. 1 is a perspective view of a fastener in accordance with the present invention.

FIG. 2 is a side elevational view of the fastener of FIG. 1.

FIG. 3 is a bottom elevational view of the fastener of FIG. 1.

FIG. 4 is a top elevation view of the fastener of FIG. 1.

FIG. 5 is an end elevation view of the fastener of FIG. 1.

FIG. 6 is a vertical cross section view of FIG. 1 taken through the plane designated by the line 6—6 thereof.

DETAILED DESCRIPTION OF THE PREFERRED EMBODIMENT

Figure 7:
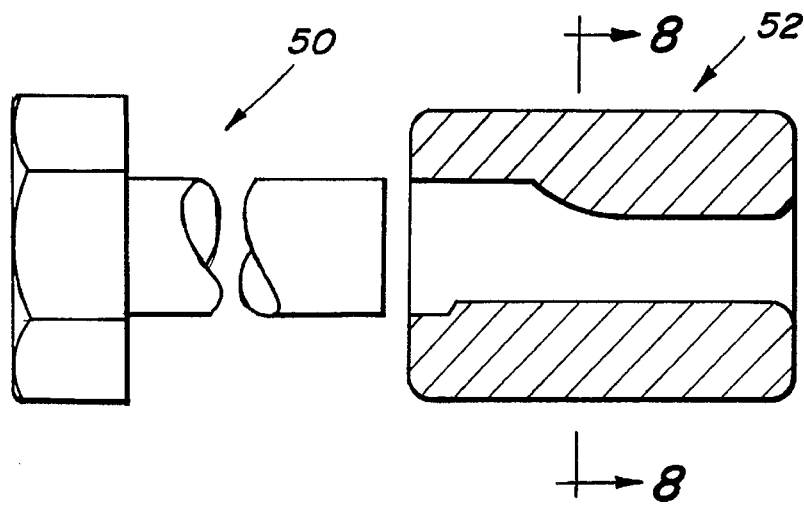
FIG. 7 is a cross sectional view of a die for manufacturing the fastener of FIG. 1.

Turning to the figures, particularly FIG. 1, a threaded fastener bolt is illustrated and designated with the reference numeral 10. The threaded bolt 10 includes a head 12, a shank 14 projecting from the head 12, and a tip 16 at the end of the shank 14 opposing the head 12. Also, a washer 18 may be positioned adjacent the head 12.

The head 12 may be adapted to be engaged by a tool for applying rotational torque. The head may be slotted to receive a flat or Phillips head screw driver, or may be formed as shown with a hex head to provide flat areas for receiving a wrench or a variety of other drive configurations.

The shank 14 includes a threaded peripheral surface 20 and predetermined major and minor thread diameters. The peripheral surface 20 is continuous about the shank 14 having an arc circle of 360°. Generally, the shank 14 has a substantially circular cross section and a longitudinal axis 22.

The tip 16 projects from the shank 14 and defines an axis 24 which is eccentric and generally parallel with the axis 22 of the shank. The tip 16 includes a non-threaded, relatively smooth portion 26 and a partially threaded portion 28 with a recess 30 in the partially threaded portion 28. The partially threaded portion 28 has a peripheral surface, which is on an arc substantially coincident and continuous with the peripheral arc of the shank surface 20. The portion 28 is continuous with and on a longitudinal line 32 when viewed in side elevation, as shown in FIG. 2. Generally, the portion 28 has zero to one or more partial threads opposing the smooth portion 26 and substantially aligned on a longitudinal line 34, which defines an edge of the major thread diameters when viewed in a side elevation, as shown in FIG. 2.

The recess or flute 30 extends from the end of the tip along the partially threaded portion 28 into at least one of the full threads on the shank. The recess or flute 30 has an overall rectangular shape or it may be elliptical, and when viewed in plan, as in FIG. 5, is positioned 180° with respect to the center of the smooth portion 26. The recess 30 has a uniform depth and follows along both the tip and shank portion. The recess has a thickness which is about 10% to 33% of the diameter of the shank 14.

The tip smooth portion 26 has an arcuate peripheral surface 40. The edge 41 of surface 40 defines a curve with respect to the longitudinal axes having an arcuate slope of a predetermined radius 42 when viewed in a side or top elevation as seen in FIGS. 2 and 4. The slope of the edge 41 is concave with respect to the line 44. The radius 42 is at a ratio with respect to the major thread diameter at from about 4.5:1 to about 0.5:1 and more preferably from about 2.1 to about 1.2:1. The ends 45 and 46 of the surface 40 continuously blend into the threaded portion of the shank. The tip 16, in cross section, has a non-circular cross section, as seen in FIG. 6. The section 26 covers approximately from about 40% to about 80%, preferably from about 50% to 70% of the periphery of the tip 16.

Figure 8:
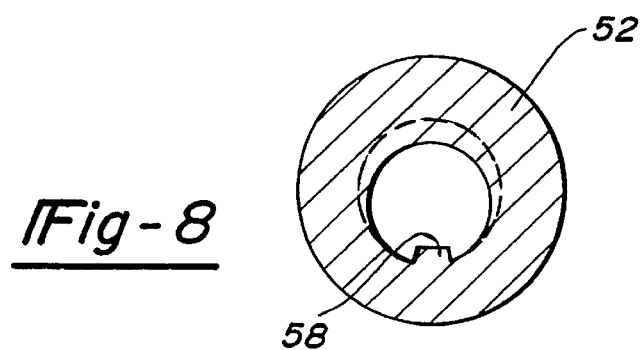
FIG. 8 is a cross sectional view of FIG. 7 along line 8—8 thereof.
Figure 3A:
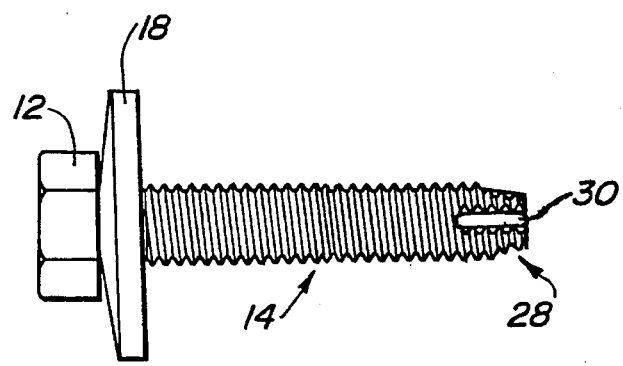
FIG. 3A is a view like FIG. 3 of an alternative embodiment of the present invention.

Turning to FIGS. 7 and 8, dies are illustrated for manufacturing the fastener tip as described above. First, a blank 50 is provided of a desired diameter. The blank is forced into dies, only the die 52 is shown, to form an unthreaded fastener having a head, desired shank diameter as well as the tip 16. Also, simultaneously with forming the above described fastener, the recess 30 is formed in the blank 50. As can be seen from the die 52, the member 58 extends a uniform distance into the die aperture opposing the arcuate portion, which forms smooch surface 26. Thus, the member forms a uniform depth in the recess tip and shank. Also, as can be seen in FIG. 8, the member 58 has an overall rectangular shape to form the rectangular recess.

After the tip and recess is formed in the shank and tip, the threads are rolled onto the shank. The threads are rolled underneath the portion of the tip as described. After rolling the threads, if desired, a coating, lubricant or the like may be added to the threads. After the process, a bolt is formed like that illustrated above.

The present bolt provides a recess to accumulate foreign material that would be otherwise carried into the mating area between the external and internal threads. Thus, the present invention eliminates the possibility of galling and seizing, which happen when foreign material is carried into the threads during assembly. Further, the invention provides an anti-cross thread screw with a cleaning recess.

While the above detailed description describes the preferred embodiment of the present invention, the invention is susceptible to modification, variation, and alteration without deviating from the scope and fair meaning of the subjoined claims.

What is claimed is:

1. A method of manufacturing a fastener comprising:

forming a blank having a head and an unthreaded shank;

forming said blank into a header die means;

forming a tip having a smooth peripheral surface with its edge defining a curve with respect to a longitudinal axis and a recess in said tip opposing said smooth peripheral surface;

forming threads on said shank and on said tip opposite said smooth peripheral surface such that said recess extends from said tip through at least a first full thread.

2. The method according to claim 1, further comprising forming said recess to have an overall rectangular or elliptical shape.

3. The method according to claim 1, further forming said recess in said shank and tip with a uniform depth.

4. The method according to claim 1, wherein said recess width has a size equal to about 10% to 33% of the diameter of said shank.

* * * * *